United States Patent
Tamir et al.

(10) Patent No.: US 11,134,125 B2
(45) Date of Patent: Sep. 28, 2021

(54) ACTIVE LINK DURING LAN INTERFACE RESET

(71) Applicant: Intel Corporation, Santa Clara, CA (US)

(72) Inventors: Eliezer Tamir, Bait Shemesh (IL); Ben-Zion Friedman, Jerusalem (IL); Itamar Levin, Holon (IL)

(73) Assignee: Intel Corporation, Santa Clara, CA (US)

(*) Notice: Subject to any disclaimer, the term of this patent is extended or adjusted under 35 U.S.C. 154(b) by 413 days.

(21) Appl. No.: 15/749,645

(22) PCT Filed: Sep. 23, 2016

(86) PCT No.: PCT/US2016/053398
§ 371 (c)(1),
(2) Date: Feb. 1, 2018

(87) PCT Pub. No.: WO2017/053770
PCT Pub. Date: Mar. 30, 2017

(65) Prior Publication Data
US 2018/0234507 A1    Aug. 16, 2018

Related U.S. Application Data

(60) Provisional application No. 62/232,798, filed on Sep. 25, 2015.

(51) Int. Cl.
*H04L 12/851* (2013.01)
*H04L 29/06* (2006.01)
(Continued)

(52) U.S. Cl.
CPC ........ *H04L 67/145* (2013.01); *H04L 41/0816* (2013.01); *H04L 47/24* (2013.01);
(Continued)

(58) Field of Classification Search
CPC ... H04L 41/0816; H04L 47/24; H04L 47/266; H04L 47/30; H04L 49/9068;
(Continued)

(56) References Cited

U.S. PATENT DOCUMENTS 8,913,502 B2    12/2014    Diab
8,943,490 B1    1/2015    Jain et al.
(Continued)

FOREIGN PATENT DOCUMENTS

CN    103370909 A    10/2013
CN    104081797 A    10/2014
(Continued)

OTHER PUBLICATIONS

Extended European Search Report for Patent Application No. 16849732.9, dated Jun. 5, 2019, 17 pages.
(Continued)

*Primary Examiner* — Melvin C Marcelo
*Assistant Examiner* — Natali Pascual Peguero
(74) *Attorney, Agent, or Firm* — Compass IP Law PC

(57) ABSTRACT

Methods and apparatus for supporting active link status during LAN interface reset and reconfigurations. Under one aspect, during normal operations traffic is transmitted over an Ethernet link coupling a first link partner to a second link partner. In response to a network interface re-configuration event, transmission of traffic over the Ethernet link is paused while keeping the Physical layer (PHY) of the Ethernet link active. The configuration of the first link partner is updated while the transmission of traffic is paused and the PHY of the Ethernet link is active. Upon completion of the configuration update, the link partners resume transmission of traffic over the Ethernet link. Additional schemes are provided that support re-configuration of network interfaces that support link and per priority flow control. According to another (Continued)

aspect, separate power domains are used for the PHY and the MAC circuitry, enabling the MAC circuitry to be reset via a power cycle while maintaining power to the PHY circuitry.

22 Claims, 3 Drawing Sheets

(51) Int. Cl.
| | |
|---|---|
| *H04L 29/08* | (2006.01) |
| *H04L 12/24* | (2006.01) |
| *H04L 12/861* | (2013.01) |
| *H04L 12/835* | (2013.01) |
| *H04L 12/825* | (2013.01) |
| *H04L 12/28* | (2006.01) |

(52) U.S. Cl.
CPC ............ *H04L 47/266* (2013.01); *H04L 47/30* (2013.01); *H04L 49/9068* (2013.01); *H04L 67/025* (2013.01); *H04L 69/24* (2013.01); *H04L 69/322* (2013.01); *H04L 69/323* (2013.01); *H04L 69/324* (2013.01); *H04L 12/28* (2013.01)

(58) Field of Classification Search
CPC ..... H04L 67/025; H04L 67/145; H04L 69/24; H04L 69/322; H04L 69/323; H04L 69/324; H04L 12/28
See application file for complete search history.

(56) References Cited

U.S. PATENT DOCUMENTS

| | | | |
|---|---|---|---|
| 2002/0064155 A1 | 5/2002 | Yen et al. | |
| 2002/0078249 A1 | 6/2002 | Lu et al. | |
| 2008/0205388 A1* | 8/2008 | Colville | ................... H04L 45/26 370/389 |
| 2010/0128738 A1* | 5/2010 | Barrass | ................... H04L 12/10 370/445 |
| 2011/0261686 A1 | 10/2011 | Kotha et al. | |
| 2012/0195203 A1* | 8/2012 | Godbole | ................. H04L 47/26 370/236 |
| 2012/0287829 A1* | 11/2012 | Chang | ....................... H04L 5/16 370/296 |
| 2013/0007495 A1 | 1/2013 | Maciocco et al. | |
| 2014/0258813 A1 | 9/2014 | Lusted et al. | |
| 2016/0352535 A1* | 12/2016 | Hiscock | .............. H04L 49/3054 |

FOREIGN PATENT DOCUMENTS

| | | |
|---|---|---|
| EP | 2362578 A1 | 8/2011 |
| EP | 2479925 A1 | 7/2012 |
| WO | 2015061357 A1 | 4/2015 |

OTHER PUBLICATIONS

First Chinese and English Translation of P.R. China State Intellectual Property Office Office Action for Patent Application No. 201680055812.3, dated May 20, 2020, 27 pages.
First European Office Action for Patent Application No. 16849732.9, dated Apr. 14, 2020, 4 pages.
International Preliminary Report on Patentability for PCT Patent Application No. PCT/US16/53398, dated Mar. 27, 2018, 13 pages.
International Search Report and Written Opinion for PCT Patent Application No. PCT/US16/53398, dated Jan. 5, 2017, 17 pages.
Partial European Search Report for Patent Application No. 16849732.9, dated Feb. 27, 2019, 7 pages.
Second Chinese and English Translation of P R. China State Intellectual Property Office Office Action for Patent Application No. 201680055812.3, dated Nov. 5, 2020, 4 pages.
Second European Office Action for Patent Application No. 16849732.9, dated Nov. 26, 2020, 7 pages.

* cited by examiner

ACTIVE LINK DURING LAN INTERFACE RESET

CROSS-REFERENCE TO RELATED APPLICATION

This patent application is a U.S. National Phase Application under 35 U.S.C. Section 371 of International Application No. PCT/US2016/053398, filed on Sep. 23, 2016, entitled "ACTIVE LINK DURING LAN INTERFACE RESET" which claims benefit of provisional 62/232,798, filed on Sep. 25, 2015, which is hereby incorporated herein by reference in its entirety and for all purposes.

BACKGROUND

The use of Ethernet protocols and associated devices is ubiquitous for computer networking. For example, the vast majority of local area networks (LANs) employ either wired or wireless Ethernet links, as respectively defined by the IEEE 802.3 and IEEE 802.11-based standards. At times, it is necessary to reconfigure one or more Ethernet devices. For many Ethernet devices, there are configuration changes that need a reset to the hardware. This is often done to assure that there is a clean configuration for the new settings. A firmware update also typically requires a device reset.

Currently, a hardware reset will cause the PHY (Physical Layer) to be reset along with the rest of the hardware. This will cause the link to go down, resulting in an inactive link status. In some cases, it may take several seconds for the link to come up again (i.e., return to an active status). The link loss will interrupt the user's work, so it is desirable to minimize the time that the link is down as much as possible. In many instances, the behavior of software upon sensing a link being taken down or becoming unavailable makes the problem even worse. For example, computers running Microsoft Windows operating systems treat a lost link as a far end rest to all TCP connections. Moreover, once the link is reset, in some cases (like for IEEE802.3 10GBASE-KR) additional procedures may be required in order to bring the link up again. For instance, an Auto Negotiation or link-partner parallel detect may be repeated, resulting in additional time being consumed.

Generally, the main reason for bringing down a link when resetting an Ethernet device is that the device is incapable of handling any traffic that the PHY would receive while the MAC (Media Access Channel Layer) is being reset and reconfigured. Ethernet data is sent over the MAC layer (Layer 2) as Ethernet frames, with corresponding electronic data signals being sent over the PHY. Accordingly, data is received by the PHY as a stream of electronic signals (or multiple signal streams in parallel for multi-lane links), and the PHY performs a series of processes on the electronic signals to output a bitstream of data. The bitstream of data is logically partitioned in a sequence of Ethernet frames. It is the responsibility of the MAC layer to generate Ethernet frames for outbound data transfers, and to de-encapsulate data contained in Ethernet frames for inbound data. On the receive side, when the MAC is unavailable (due to being reset or reconfigured), the bitstream of data output by the PHY is lost, as there is no place to buffer the data. Typically when a link is down the Transmitter knows this and will both refrain from transmitting and will indicate this to SW which will mark the connection as unavailable and refrain from queueing more data through the link.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
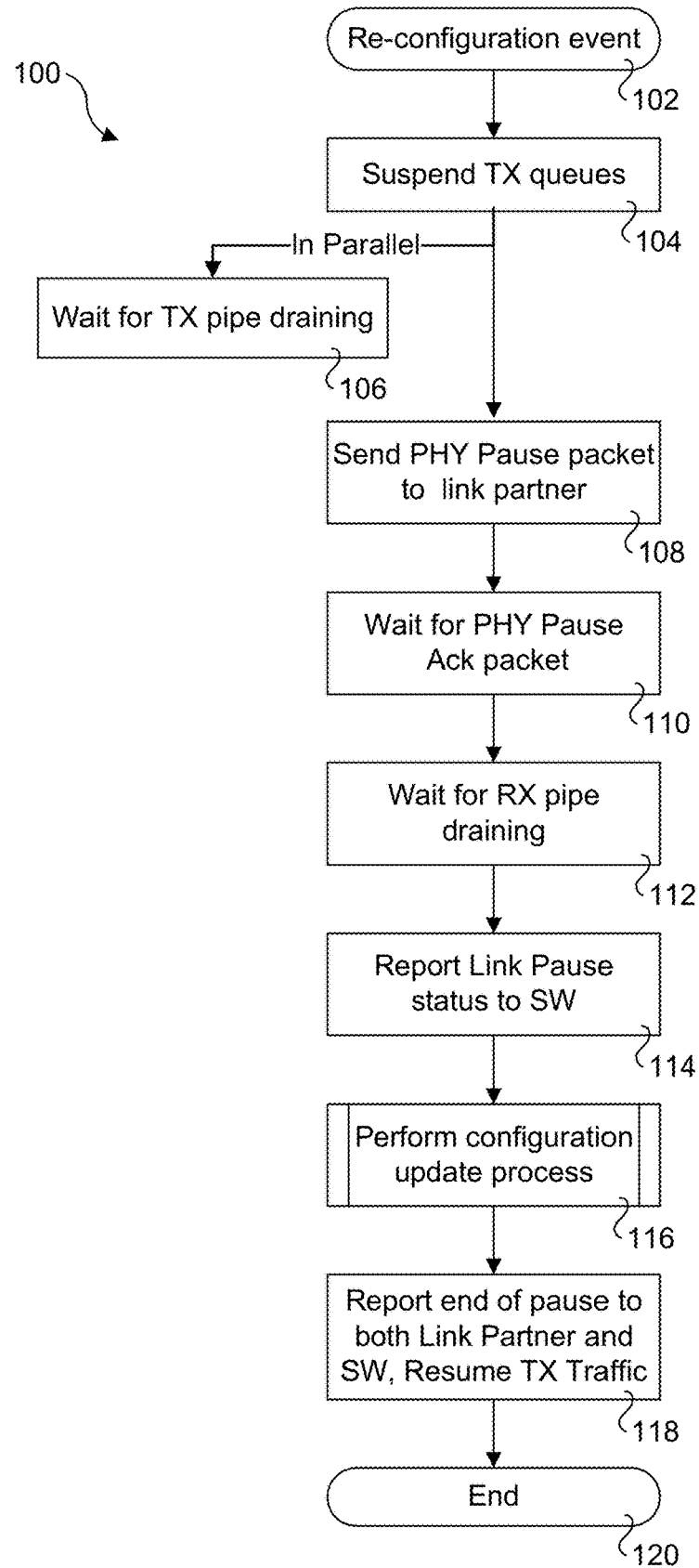
FIG. 1 is a flowchart illustrating a process for reconfiguring and/or resetting a link while keeping an active status, according to one embodiment.

Embodiments of methods and apparatus for supporting active link status during LAN interface reset and reconfigurations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with the embodiments disclosed herein, techniques are provided that enable Ethernet links to remain active during local area network (LAN) interface resets and the like. Rather than taking a link entirely down to perform a reconfiguration or reset operation, the link is "paused," leaving it in an active state from the perspective of software running on a host device in which an Ethernet device (e.g., a Network Interface Controller (NIC)) is implemented or installed.

Under a first approach, a high level protocol is implement between a NIC and a switch. The NIC tells the switch, via a "Pause" packet, "I'm going down for re-configuration, so temporarily pause sending traffic over the link." The switch and the NIC both keep the PHY link up, while sending idle symbols or whatever else needs to be done to the keep the link in an active state. A switch in a LAN may treat the links as logically down, but may also cache some of the old configuration. For example, the "going down" or link "Pause" packet might contain a hint as to what can be safely cached; for example: MAC address, IP address, etc.

In some data center environments, NICs and switches may be configured to implement data center bridging (DCB). DCB is a collection of standards-based enhancements to Ethernet LANs that is commonly used for clustering and storage area networks (SANs), but may be used for other purposes, as well. The DCB standards include Priority-based Flow Control (PFC): IEEE 802.1Qbb, Enhanced Transmission Selection (ETS): IEEE 802.1Qaz, and Congestion Notification: IEEE 802.Qau.

If DCB is configured, in one embodiment the NIC can send DCB messages inhibiting its peers from transmitting data for the non-drop traffic classes (TC's). The NIC may also drop droppable packets for the TC's that permit dropping of packets. If Pause ability was negotiated for this link, the NIC can send Pause frames while the MAC is being reconfigured and refrain from actually resetting the PHY.

If none of the foregoing are available, the MAC can keep the link up while dropping all incoming packets. In some cases this is still preferable to completely taking down the link.

While the MAC is being reconfigured, the NIC does not transmit any data. This might normally be detected by or conveyed to (e.g., via a NIC device driver) the operating system as a failed link (or otherwise some type of fault), resulting in the OS killing an upper-layer link connection (e.g., TCP/IP or other type of connection) used for transporting data over the link (and thus killing the link). To avoid this scenario, in one embodiment the NIC device driver is configured to mimic receiving a flow control pause indication for the link peer instead of telling the OS that the link is down.

For incoming traffic, various techniques may be implemented. In some embodiments, incoming packets are simply dropped, relying on an upper level protocol to recover the lost data (e.g., through a TCP retransmit or the like). Optionally, the data may be buffered. This may be tricky, since most buffer RAM commonly is in the MAC (which would be temporarily unavailable). However, buffers may be designed to support buffering of inbound traffic without explicit handling by the MAC, or by augmenting logic in the MAC. In the event of the overflow, in one embodiment the oldest data is dropped, to avoid deadlocks.

There are additional modifications that may be implemented. For example, under one embodiment, special provisions may be implemented in the PHY such as separation of MAC reset and PHY reset, and possibly other changes, so that a MAC reset will not force a PHY reset. Additional mechanisms in the PHY may also be used to support the implementation of the procedures discussed above. Also, if the PHY is in EEE (Energy-Efficient Ethernet) mode, in one embodiment the link is forced into an active mode or low power mode for the duration of the MAC reset.

With referenced to the flowchart 100 of FIG. 1, a process for reconfiguring and/or resetting a link while keeping an active status, according to one embodiment, operates in the following manner. In a start block 102, a network interface re-configuration event occurs. Generally, the link reconfiguration event includes any event that will cause a reset or reconfiguration of a link partner's network adaptor or components and/or circuitry therein. For example, in one embodiment, the network adaptor comprises a NIC, and the network interface re-configuration event causes the NIC to be reconfigured and/or reset, as described below. In response, the Transmit (TX) queues for the NIC are suspended in a block 104, while the data already in the TX pipe is drained in a block 106 (i.e., the data in the NIC's TX processing block is sent outbound onto the link).

Next, in a block 108, the NIC sends a PHY pause packet (e.g., an embodiment of the aforementioned "Pause" packet) to its link partner. In response, the link partner may return an Ack(nowledgement) packet indicating the link partner has received the pause packet. In one embodiment, the operations of block 106 and 108 (and potentially blocks 110 and 112) are performed substantially in parallel, as depicted in FIG. 1. The NIC waits to receive the PHY pause Ack packet, as depicted in block 110, while also waiting for its Receive (Rx) pipe to drain, as shown in a block 112. In one embodiment, normal pause packets are not acknowledged, while the proposed special packet is acknowledged.

In a block 114, the NIC (or agent for the NIC) reports the link pause status to software (SW) running on the Ethernet device or host device in which the Ethernet device is installed or coupled to. For example, if the NIC is implemented in a server, the NIC or agent may report a paused link status to a software agent (e.g., a daemon or listener service operating at the device driver, operating system, or user level), which informs a software data provider (e.g., a software entity that generated outbound data) that the link will be temporarily unavailable. In response, the software data provider will (preferably) pause generation of outbound data, or otherwise fill memory buffers at the software-level with such data and not push the data to be handled by the NIC's TX pipeline. Reporting the pause status may also inform a software data consumer to temporarily expect to not receive any additional inbound data (after the RX pipe is drained).

Most OSes have a flow control status indicator used to tell the networking stack not to queue more data on an interface, this is useful for when the CPU is faster than the link, (not to be confused with Ethernet flow control, this is logical SW mechanism inside the OS). In one embodiment, a "queue full" indication is used to prevent the OS from queuing more data instead of reporting the link down.

In a process block 116, the configuration update process is performed. The particular process may vary, depending on the type of re-configuration or reset that is to be performed. For example, a re-configuration resulting from a firmware update will be different than a re-configuration resulting from detecting too many data errors over the link. Under some conditions, the configuration update process may include resetting the MAC layer for the NIC (e.g., resetting circuitry and/or logic on the NIC configured to implement the NIC's MAC layer). As described below with reference to FIG. 3, in some embodiments power to the MAC and PHY layer circuitry is implemented such that the MAC and PHY circuitry comprise separate power domains that can be independently controlled, enable the MAC circuitry to be reset without resetting the PHY circuitry.

After the configuration update process of block 116 is completed, indicia indicating that the pause has ended is sent to both the link partner and the software, and transmission of TX traffic at the NIC's TX port is resumed. For example, in one embodiment, a "pause ended" packet is sent to the NIC's link partner. As before, the NIC or it agent can send data indicating the pause has ended to a software agent or the like. This results in the link returning to its normal data transfer mode, and culminates the process, as depicted by an end block 120.

Figure 2:
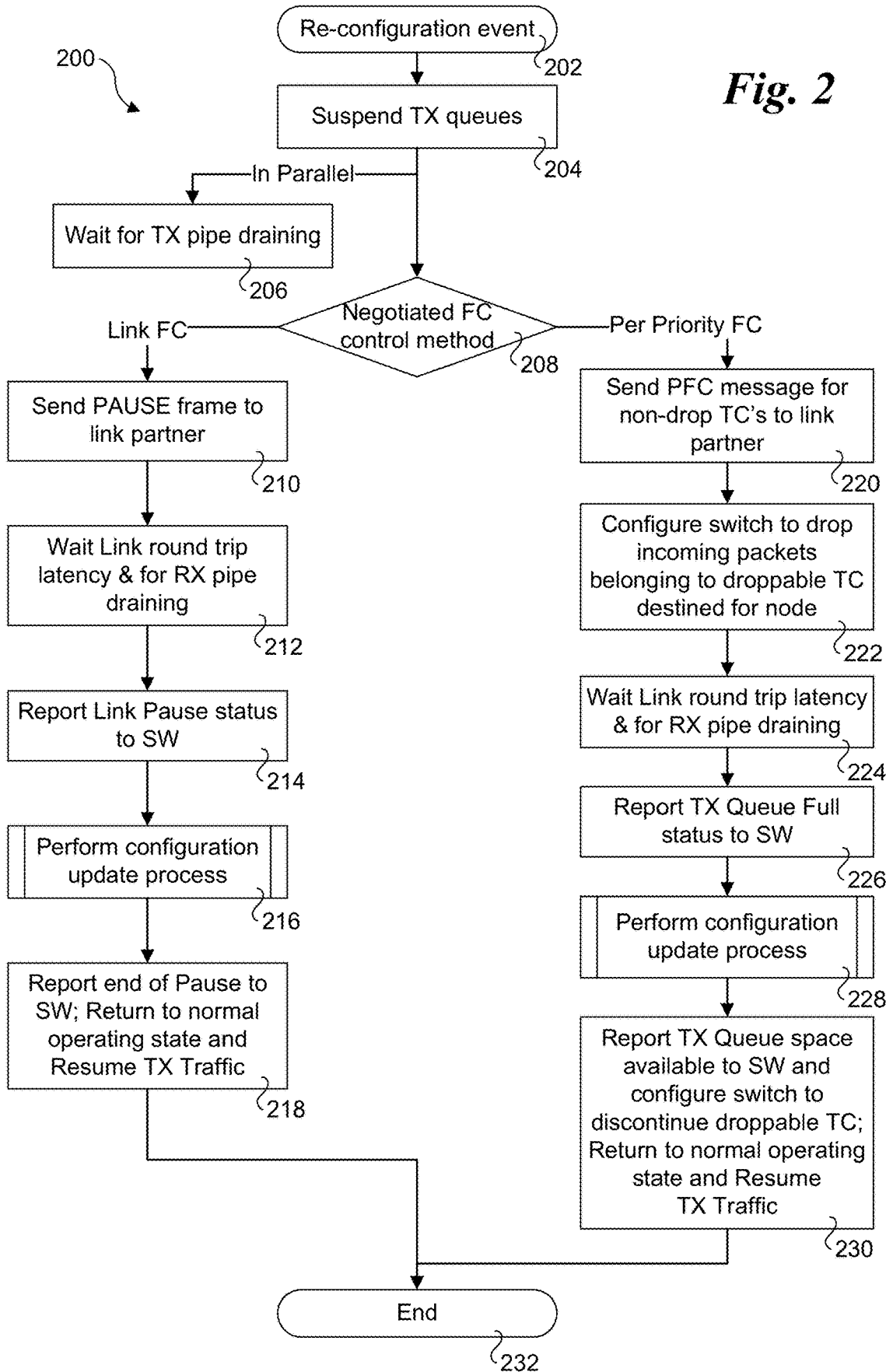
FIG. 2 is a flowchart illustrating processes for reconfiguring and/or resetting a link while keeping an active status, according to embodiments that implement link flow control and per-priority flow control.

FIG. 2 shows a flowchart 200 illustrating operations and logic in connection with other embodiments employing flow control (FC) for supporting active link functionality during LAN interface reset. FIG. 2 further shows how an Ethernet device acts when the other side (i.e., link partner) is a legacy device. As before, the process starts with a network interface re-configuration event, as shown in a start block 202. The TX queues are suspended in a block 203, and the NIC waits for the TX pipe to drain in a block 206. In one embodiment, the operation of block 206 is performed in parallel with subsequent operations in flowchart 200.

Next, in a decision block 208, a determination is made to what type of negotiated FC control method is in use. If a link FC is configured, the logic proceeds to a block 210 in which the NIC begins to send Ethernet PAUSE frames to the link partner. As defined by the IEEE 802.3 standard, an Ethernet PAUSE frame can be used to tell the link partner to PAUSE transmitting data over the link for a predetermined amount of time. In a block 212 the NIC waits for the round trip latency to receive an Ack from the link partner and for its RX pipe to drain. In the case an Ack is not sent from the link partner (meaning it won't be received), the wait is for the round trip latency only. In a block 214, the NIC reports a link pause status to the software agent (OS or other software entity). The configuration update process is then performed in a block 216, followed by reporting end of Pause to software in a block 218. The link is returned back to its active data transfer mode, which includes resuming TX traffic, which corresponds to the last operation in the process, as depicted by an end block 232.

Returning to decision block 208, if a per-priority FC (PFC) is configured, the logic proceeds to a block 220 in which a PFC message is sent for non-drop TC's to the link partner. As discussed above, DCB messages (which includes PFC messages), are used to inhibit peers (e.g., other nodes in the network) from transmitting data to a node identified in the PFC message (e.g., the NIC in this example). Generally, a PFC message can be configured to inhibit the peers from transmitting data to a particular destination (using the address of the sender, which is the NIC in this case) on an individual flow basis, for a predetermined amount of time. This enables the NIC to temporarily inhibit flows corresponding to non-drop traffic classes that are destined for the NIC.

The switch is configured in a block 222 to drop incoming packet belonging to (a) droppable traffic class(es) destined for the network node. The effect of the operation of block 220 is packets belonging to drop TC's that would normally be forwarded to the network node are dropped at the switch.

In a block 224, the NIC waits for the link round trip latency and for its RX pipe to drain. A TX "queue full" status is then reported to software (e.g., a software agent or the like) in a block 226. This informs the software that the TX queue is full, which will result in the software not adding addition packets to the TX queue until the TX queue status changes. The configuration update process for the NIC is then performed in a block 228. This is similar to the configuration update process of block 116 discussed above.

At the completion of the configuration update process, a TX queue space available status is reported to the software, and the switch is configured to discontinue dropping packets belonging to the droppable TC's, as shown in a block 230. This result in each of the link partners returning to their respective operation states before the network interface re-configuration event, enabling TX traffic to be resumed. Similarly, the network node is enabled to resume receiving RX traffic.

It is noted that some operations shown in flowcharts 100 and 200 that are performed by the TX and RX sides may be performed in parallel or otherwise concurrently for at least a portion of the duration of the operation. For example, the TX pipe draining and RX pipe draining operations may be performed in parallel/concurrently, as well as other operations, such as discussed above.

Exemplary Network Node and Switch

Figure 3:
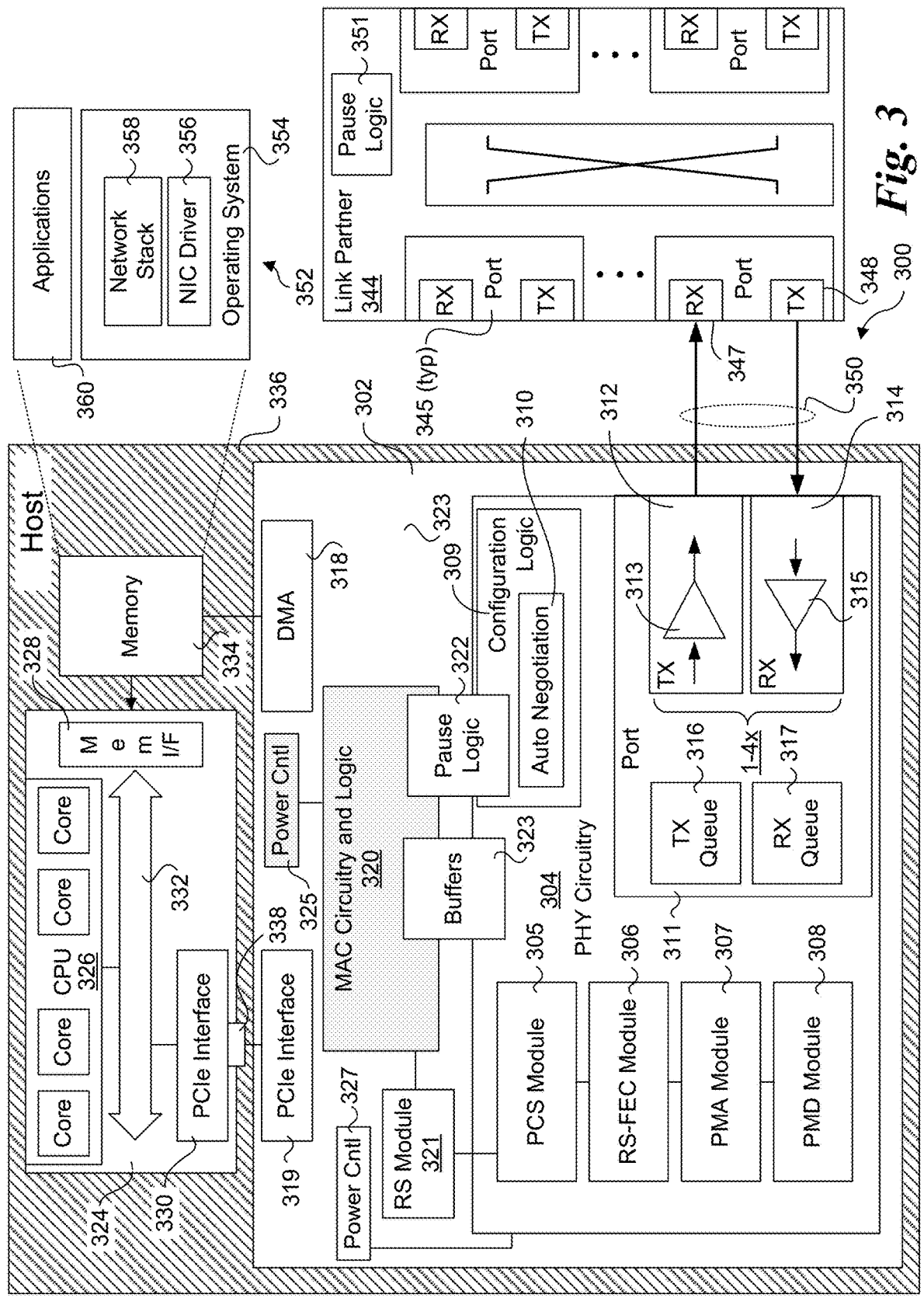
FIG. 3 is a block schematic architecture diagram for a network node in which aspects of the embodiments described herein may be implemented.

FIG. 3 shows an architecture for a network node 300 employing a network chip 302 (e.g., a NIC) configured to perform link operations in accordance with aspects of the embodiments disclosed herein. Network chip 302 comprises PHY circuitry 304 including a Physical Coding Sublayer (PCS) module 305, a Reed-Solomon Forward Error Correction (RS-FEC) module 306, a Physical Medium Attachment (PMA) module 307, a PMD module 308, and configuration logic 309 including an Auto-Negotiation module 310. Network chip 302 includes a network port 311 comprising a transmitter (TX) 312 including transmitter circuitry 313 and a receiver 314 including receiver circuitry 315. Network port 311 is further depicted as including a TX queue 316 and an RX queue 317. As further shown, port 311 may support 1-4 lanes, depending on the particular type of Ethernet link and PHY that is supported. For example, a 25GBASE-KR PHY or a 25GBASE-CR PHY employs a single lane, while a 100GBASE-KR PHY or a 100GBASE-CR PHY employs four lanes.

Network chip 302 further includes a DMA (Direct Memory Access) interface 318, a Peripheral Component Interconnect Express (PCIe) interface 319, MAC circuitry and logic 320, a Reconciliation Sublayer (RS) module 321, Pause logic 322, buffers 323 and power control blocks 325 and 327. As will be understood by those having skill in the Ethernet art, various existing and future Ethernet PHYs and MACs may include different modules and sub-layers than that shown in FIG. 3, and the blocks and components illustrated in FIG. 3 are exemplary and non-limiting.

Network node 300 also comprises a System on a Chip (SoC) 324 including a Central Processing Unit (CPU) 326 having one or more processor cores, coupled to a memory interface 328 and a PCIe interface 330 via an interconnect 332. Memory interface 328 is further depicted as being coupled to memory 334. Under one configuration, network chip 302, SoC 324 and memory 334 will be mounted on or otherwise operatively coupled to a circuit board 336 that includes wiring traces for coupling these components in communication, as depicted by single lines connecting DMA 318 to memory 334 and PCIe interface 319 to PCIe interface 330 at a PCIe port 338. As an optional configuration, the components depicted for SoC 324 and network chip 302 may be combined on an SoC, a multi-chip module, or a device having similar device packaging. In one embodiment, network node comprises a server blade or server module. As yet another option, the components illustrated for network chip 302 may be implemented on a network card including a NIC that is installed in a PCIe slot of a host server.

In one embodiment, MAC circuitry and logic 320 is configured to implement aspects of the MAC layer operations performed that are well-known in the art. Similar, RS module 321 is configured to implement reconciliation sublayer operations. MAC circuitry and logic 320 is illustrative of MAC layer circuitry and logic that is reconfigured/updated in response to network interface re-configuration events described herein.

Various software 352 is loaded into memory 334 and executed on one or more of the processor cores. Software 352 includes an operating system 354 having a NIC device driver 356 and a network stack 358, and user applications 360 that operate at a user level in the software architecture. Generally, one or more of the user applications will be data producers and/or consumers that employ network stack 358 to send and receive data via network chip 302. NIC device driver 356 provides an interface between operating system 354 and network chip 302, enabling the OS and other software components to communicate with network chip 302.

During link initialization and during subsequent data transfer operations, data is exchanged between PHY transmitter and receiver 312 and 314 of network node 300 and its link partner, as depicted by a link partner 344. In the illustrated embodiment, link partner 344 is a switch including a plurality of ports 345 coupled to a crossbar 346. Optionally, link partner 344 may be another network node or other type of link endpoint device. Each port 345 includes a receiver 347 and a transmitter 348, with the receiver and transmitter of one of the ports linked in communication with transmitter 312 and receiver 314 via an Ethernet link 350. Link partner 344 further includes Pause logic 351.

During link Pause operations, embedded logic in Pause logic 322 and Pause logic 351 is implemented, in part, to perform the Pause operations of the various embodiments discussed herein and as shown in FIGS. 1 and 2. As illustrated, a portion of Pause logic is implemented as part of PHY circuitry 304, while another portion is implemented in MAC circuitry and logic 320. One having skill in the art will recognize that the Pause logic may be implemented as one or more logical blocks in the silicon for network chip 302. Similarly, the Pause logic may be implemented in a switch, either as embedded logic in a switch chip, or in a logic component in the switch.

A novel aspect of network chip 302 is that employs a bifurcated power design under which power input to the PHY circuitry and the MAC circuitry can be separately controlled via power control blocks 325 and 327. Effectively, the MAC circuitry and PHY circuitry have separate power domains. This enables the MAC circuitry to be reset through a power cycle or the like, while concurrently maintaining power to the PHY circuitry. In addition, network chip 302 includes glue logic (not shown) that allows buffers 323 to be accessible from both power domains when they are powered on and are accessible from the PHY circuitry power domain when the MAC circuitry power domain is powered off. This enables the PHY circuitry to buffer received Ethernet frame data while the MAC circuitry is being reset.

Under current network chip designs, the MAC and PHY circuitry share the same power input, and thus resetting the MAC circuitry with a power cycle also resets the PHY, which subsequently requires the link to be retrained when the power for the PHY is brought back up. Under the novel approach disclosed herein, the PHY stays active while the MAC circuitry is being reset, and thus the link can resume transmission of traffic after a MAC reset without having to retrain the link.

Under various embodiments, network chip 302 comprises one of a 25 Gb/s Ethernet Network Interface Controller (NIC) chip employing a 25GBASE-KR PHY or a 25GBASE-CR PHY, or a 100 Gb/s Ethernet NIC chip employs a 100GBASE-KR PHY or a 100GBASE-CR PHY. More generally, network chip 302 comprises interfaces with signaling rates such as and not limited to 25 Gb/s, 50 Gb/s or 100 Gb/s and beyond using any existing or future protocol. However, the circuitry and components of network chip 302 may also be implemented in other types of chips and components, including SoCs, multi-chip modules, and NIC chips including support for multiple network interfaces (e.g., wired and wireless). A similar scheme may also be applied to other networking and fabric types, such as Infini-Band, etc.

Further aspects of the subject matter described herein are set out in the following numbered clauses:

1. A method comprising:
   transmitting traffic over an Ethernet link coupling a first link partner to a second link partner;
   pausing transmitting traffic over the Ethernet link while keeping the Physical layer (PHY) of the Ethernet link active;
   updating a configuration of the first link partner while traffic transmitted over the Ethernet link is paused and the PHY of the Ethernet link is active; and
   resuming transmitting traffic over the Ethernet link.

2. The method of clause 1, further comprising:
   in response to a network interface re-configuration event,
      sending a first message from the first link partner to the second link partner to pause the link; and
   after the configuration of the first link partner has been updated,
      sending a second message from the first link partner to the second link partner to end pausing the link.

3. The method of clause 2, wherein the first link partner comprises a network device installed in a host device, further comprising:
   reporting a link pause status to software running on the host device.

4. The method of clause 3, wherein the first link partner includes one or more transmit queues and employs a transmit pipe for transmitting packets, further comprising:
   in response to the network interface re-configuration event,
      suspending the one or more transmit queues; and
      waiting for a transmit pipe to drain prior to updating the configuration of the first link partner.

5. The method of clause 3 or 4, further comprising:
   reporting an end of link pause status to the software running on the host device after the first link partner configuration has been updated.

6. The method of any of the preceding clauses, wherein each of the first and second link partners support link flow control and received packets are processed by the first link partner using a receive pipe, the method further comprising:
   sending a Ethernet PAUSE frame from the first link partner to the second link partner; and
   waiting a link round trip latency and for the receive pipe to drain prior to updating the configuration of the first link partner.

7. The method of clause 6, wherein the first link partner comprises a network device installed in a host device, further comprising:
   prior to updating the configuration of the first link partner, reporting a link pause status to software running on the host device; and after the configuration of the first link partner has been updated,
      reporting a link end of pause status to the software running on the host device.

8. The method of any of the preceding clauses, wherein the first link partner comprises an Ethernet Network Interface Controller (NIC).

9. The method of any of the preceding clauses, wherein the second link partner comprises an Ethernet switch.

10. The method of any of the preceding clauses, wherein updating the configuration of the first link partner comprises reconfiguring a Media Access Channel (MAC) layer for the first link partner.

11. The method of clause 10, wherein reconfiguring the MAC layer for the first link partner comprises resetting at least a portion of circuitry on the first link partner used to implement the MAC layer.

12. A method comprising:
transmitting traffic over an Ethernet link coupling a first link partner to a second link partner, wherein each of the first and second link partners support priority-based flow control and the second link partner is a switch, and wherein the traffic includes one or more droppable traffic classes;
in response a network interface re-configuration event,
configuring the switch to drop incoming packets belonging to the one or more droppable traffic classes that are destined for the first link partner;
updating a configuration of the first link partner while the switch is configured to drop incoming packets belonging to the one or more droppable traffic classes and destined for the first link partner; and
configuring the switch to discontinue dropping incoming packets belonging to the one or more droppable traffic classes that are destined for the first link partner after the configuration of the first link partner is updated.

13. The method of clause 12, wherein the traffic includes one or more non-drop traffic classes, the method further comprising:
sending a priority flow control message for the one or more non-drop traffic classes from the first link partner to the switch to inhibit transmission of packets belonging to the one or more non-drop traffic classes to the first link partner.

14. The method of clause 12 or 13, wherein received packets are processed by the first link partner using a receive pipe, the method further comprising:
waiting a link round trip latency and for the receive pipe to drain prior to updating the configuration of the first link partner.

15. The method of any of clauses 12-14, wherein the first link partner comprises a network device installed in a host device and wherein the network device includes a receive queue, further comprising:
prior to updating the configuration of the first link partner, reporting a transmit queue full status to software running on the host device; and,
after the configuration of the first link partner has been updated,
reporting a transmit queue available status to the software running on the host device.

16. The method of any of clauses 12-15, wherein the first link partner comprises an Ethernet Network Interface Controller (NIC).

17. The method of any of clauses 12-16, wherein the second link partner comprises an Ethernet switch.

18. The method of any of clauses 12-17, wherein updating the configuration of the first link partner comprises reconfiguring a Media Access Channel (MAC) layer for the first link partner.

19. The method of clause 18, wherein reconfiguring the MAC layer for the first link partner comprises resetting at least a portion of circuitry on the first link partner used to implement the MAC layer.

20. An Ethernet apparatus, comprising:
PHY circuitry and logic configured to implement a Physical layer (PHY) including,
for each of one or more lanes,
a transmitter; and
a receiver;
one or more transmit queues, operatively coupled to the transmitter;
one or more receive queues, operatively coupled to the receiver; and
MAC circuitry and logic configured to implement a Media Access Control (MAC) layer,
wherein the Ethernet apparatus is configured, when coupled to a link partner via an Ethernet link, to,
transmit traffic over the Ethernet link to the link partner;
pause transmitting traffic over the Ethernet link while keeping the PHY active;
update a configuration of the MAC layer while traffic transmitted over the Ethernet link is paused and the PHY is active; and
resume transmitting traffic to the link partner over the Ethernet link following the update of the configuration of the MAC layer.

21. The Ethernet apparatus of clause 20, further configured, when coupled to the link partner via the Ethernet link, to:
in response to a network interface re-configuration event,
transmit a first message to the link partner to pause the Ethernet link; and after the configuration of the MAC layer has been updated,
transmit a second message to the link partner to end pausing the Ethernet link.

22. The Ethernet apparatus of clause 21, further configured, when coupled to the link partner via the Ethernet link and installed in the host device, to:
transmit a PHY pause packet to the link partner, the PHY pause packet comprising the first message to the link partner to pause the Ethernet link; and
receive a PHY pause acknowledgement packet sent from the ink partner; and 23. The Ethernet apparatus of clause 21 or 22, wherein the Ethernet apparatus is configured to be installed in a host device, further configured, when coupled to the link partner via the Ethernet link and installed in the host device, to:
report a link pause status to software running on the host device.

24. The Ethernet apparatus of clause 23, wherein the Ethernet apparatus employs a receive pipe for receiving packets, further configured, when coupled to the link partner via the Ethernet link, to:
wait for the receive pipe to drain prior to reporting link pause status to the software running on the first link partner.

25. The Ethernet apparatus of clause 23 or 24, further configured, when coupled to the link partner via the Ethernet link, to:
report an end of link pause status to the software running on the host device after the configuration of the MAC layer has been updated.

26. The Ethernet apparatus of any of clauses 20-25, wherein updating a configuration of the MAC layer while traffic transmitted over the Ethernet link is paused includes resetting at least a portion of the MAC circuitry and logic.

27. The Ethernet apparatus of clause 26, wherein separate MAC and PHY power domains are implemented for the MAC circuitry and logic and the PHY circuitry and logic, and wherein resetting at least a portion of the MAC circuitry and logic comprises power cycling power to the MAC power domain while maintaining power to the PHY power domain.

28. The Ethernet apparatus of any of clauses 20-27, wherein each of the Ethernet apparatus and the link partner support link flow control and wherein received packets are processed by the Ethernet apparatus using a receive pipe, further configured, when coupled to the link partner via the Ethernet link, to:
    transmit an Ethernet PAUSE frame to the link partner; and
    wait a link round trip latency and for the receive pipe to drain prior to updating the configuration of the MAC layer.

29. The Ethernet apparatus of clause 28, wherein the Ethernet apparatus is configured to be installed a host device, further configured, when coupled to the link partner via the Ethernet link and installed in the host device, to:
    prior to updating the configuration of the MAC layer,
        reporting a link pause status to software running on the host device; and after the configuration of the MAC layer has been updated,
        reporting a link end of pause status to the software running on the host device.

30. The Ethernet apparatus of any of clauses 20-29, wherein the Ethernet apparatus comprises an Ethernet Network Interface Controller (NIC).

31. The Ethernet apparatus of any of clauses 20-30, wherein the circuitry and logic configured to implement a Physical layer (PHY) is configured to implement one of a 25GBASE-KR PHY, a 25GBASE-CR PHY, a 100GBASE-KR PHY or a 100GBASE-CR PHY.

32. An Ethernet apparatus, comprising:
    PHY circuitry and logic configured to implement a Physical layer (PHY) including,
        for each of one or more lanes,
            a transmitter; and
            a receiver;
    one or more transmit queues, operatively coupled to the transmitter;
    one or more receive queues, operatively coupled to the receiver;
    MAC circuitry and logic configured to implement a Media Access Control (MAC) layer; and
    logic to support priority based flow control;
    wherein the Ethernet apparatus is configured, when coupled to a switch that supports priority based flow control via an Ethernet link, to:
        transmit traffic to and receive traffic from the switch over the Ethernet, wherein the traffic includes one or more droppable traffic classes;
        send data to the switch to configure the switch to drop incoming packets belonging to the one or more droppable traffic classes that are destined for the Ethernet apparatus; and
        update a configuration of the MAC circuitry and logic while the switch is configured to drop incoming packets belonging to the one or more droppable traffic classes and destined for the Ethernet apparatus; and
        cause the switch to discontinue dropping incoming packets belonging to the one or more droppable traffic classes that are destined for the Ethernet apparatus after the configuration of the MAC circuitry and logic is updated.

33. The Ethernet apparatus of clause 32, wherein the traffic includes one or more non-drop traffic classes, further configured, when coupled to the switch via the Ethernet link, to:
    send a priority flow control message for the one or more non-drop traffic classes to the switch to inhibit transmission of packets belonging to the one or more non-drop traffic classes to the Ethernet apparatus.

34. The Ethernet apparatus of clause 32 or 33, wherein received packets are processed by the Ethernet apparatus using a receive pipe, further configured, when coupled to the switch via the Ethernet link, to:
    prior to updating the configuration of the MAC circuitry and logic,
        wait a link round trip latency for transmission of data to the switch and back to the Ethernet apparatus; and
        wait for the receive pipe to drain.

35. The Ethernet apparatus of any of clauses 32-34, wherein the Ethernet apparatus is configured to be installed in a host device, further configured, when coupled to the switch via the Ethernet link and installed in the host device, to:
    prior to updating the configuration of the MAC circuitry and logic,
        report a transmit queue full status to software running on the host device; and,
    after the configuration of the of the MAC circuitry and logic has been updated,
        report a transmit queue available status to the software running on the host device.

36. The Ethernet apparatus of any of clauses 32-25, wherein updating a configuration of the MAC circuitry and logic comprises resetting at least a portion of the MAC circuitry and logic.

37. The Ethernet apparatus of clause 36, wherein separate MAC and PHY power domains are implemented for the MAC circuitry and logic and the PHY circuitry and logic, and wherein resetting at least a portion of the MAC circuitry and logic comprises power cycling power to the MAC power domain while maintaining power to the PHY power domain.

38. The Ethernet apparatus of any of clauses 32-27, wherein the Ethernet apparatus comprises an Ethernet Network Interface Controller (NIC).

39. The Ethernet apparatus of any of clauses 32-38, wherein the PHY circuitry and logic is configured to implement one of a 25GBASE-KR PHY, a 25GBASE-CR PHY, a 100GBASE-KR PHY or a 100GBASE-CR PHY.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    transmitting traffic over an Ethernet link coupling a first link partner to a second link partner;
    pausing transmitting traffic over the Ethernet link while keeping the Physical layer (PHY) of the Ethernet link active;
    updating a configuration of the first link partner while traffic transmitted over the Ethernet link is paused and the PHY of the Ethernet link is active; and
    resuming transmitting traffic over the Ethernet link.

2. The method of claim 1, further comprising:
    in response to a network interface re-configuration event,
        sending a first message from the first link partner to the second link partner to pause the link; and
        after the configuration of the first link partner has been updated,
        sending a second message from the first link partner to the second link partner to end pausing the link.

3. The method of claim 2, wherein the first link partner comprises a network device installed in a host device, further comprising:
    reporting a link pause status to software running on the host device.

4. The method of claim 3, wherein the first link partner includes one or more transmit queues and employs a transmit pipe for transmitting packets, further comprising:
    in response to the network interface re-configuration event,
        suspending the one or more transmit queues; and
        waiting for a transmit pipe to drain prior to updating the configuration of the first link partner.

5. The method of claim 3, further comprising:
reporting an end of link pause status to the software running on the host device after the first link partner configuration has been updated.

6. The method of claim 1, wherein each of the first and second link partners support link flow control and received packets are processed by the first link partner using a receive pipe, the method further comprising:
sending a Ethernet PAUSE frame from the first link partner to the second link partner; and
waiting a link round trip latency and for the receive pipe to drain prior to updating the configuration of the first link partner.

7. The method of claim 6, wherein the first link partner comprises a network device installed in a host device, further comprising:
prior to updating the configuration of the first link partner, reporting a link pause status to software running on the host device; and
after the configuration of the first link partner has been updated, reporting a link end of pause status to the software running on the host device.

8. The method of claim 1, wherein the first link partner comprises an Ethernet Network Interface Controller (NIC).

9. The method of claim 1, wherein the second link partner comprises an Ethernet switch.

10. The method of claim 1, wherein updating the configuration of the first link partner comprises reconfiguring a Media Access Channel (MAC) layer for the first link partner.

11. The method of claim 10, wherein reconfiguring the MAC layer for the first link partner comprises resetting at least a portion of circuitry on the first link partner used to implement the MAC layer.

12. An Ethernet apparatus, comprising:
PHY circuitry and logic configured to implement a Physical layer (PHY) including,
for each of one or more lanes,
a transmitter; and
a receiver;
one or more transmit queues, operatively coupled to the transmitter;
one or more receive queues, operatively coupled to the receiver; and
MAC circuitry and logic configured to implement a Media Access Control (MAC) layer,
wherein the Ethernet apparatus is configured, when coupled to a link partner via an Ethernet link, to,
transmit traffic over the Ethernet link to the link partner;
pause transmitting traffic over the Ethernet link while keeping the PHY active;
update a configuration of the MAC layer while traffic transmitted over the Ethernet link is paused and the PHY is active; and
resume transmitting traffic to the link partner over the Ethernet link following the update of the configuration of the MAC layer.

13. The Ethernet apparatus of claim 12, further configured, when coupled to the link partner via the Ethernet link, to:
in response to a network interface re-configuration event, transmit a first message to the link partner to pause the Ethernet link; and
after the configuration of the MAC layer has been updated,
transmit a second message to the link partner to end pausing the Ethernet link.

14. The Ethernet apparatus of claim 13, further configured, when coupled to the link partner via the Ethernet link and installed in the host device, to:
transmit a PHY pause packet to the link partner, the PHY pause packet comprising the first message to the link partner to pause the Ethernet link; and
receive a PHY pause acknowledgement packet sent from the link partner.

15. The Ethernet apparatus of claim 13, wherein the Ethernet apparatus is configured to be installed in a host device, further configured, when coupled to the link partner via the Ethernet link and installed in the host device, to:
report a link pause status to software running on the host device.

16. The Ethernet apparatus of claim 15, wherein the Ethernet apparatus employs a receive pipe for receiving packets, further configured, when coupled to the link partner via the Ethernet link, to:
wait for the receive pipe to drain prior to reporting link pause status to the software running on the first link partner.

17. The Ethernet apparatus of claim 15, further configured, when coupled to the link partner via the Ethernet link, to:
report an end of link pause status to the software running on the host device after the configuration of the MAC layer has been updated.

18. The Ethernet apparatus of claim 12, wherein updating a configuration of the MAC layer while traffic transmitted over the Ethernet link is paused includes resetting at least a portion of the MAC circuitry and logic.

19. The Ethernet apparatus of claim 18, wherein separate MAC and PHY power domains are implemented for the MAC circuitry and logic and the PHY circuitry and logic, and wherein resetting at least a portion of the MAC circuitry and logic comprises power cycling power to the MAC power domain while maintaining power to the PHY power domain.

20. The Ethernet apparatus of claim 12, wherein each of the Ethernet apparatus and the link partner support link flow control and wherein received packets are processed by the Ethernet apparatus using a receive pipe, further configured, when coupled to the link partner via the Ethernet link, to:
transmit an Ethernet PAUSE frame to the link partner; and
wait a link round trip latency and for the receive pipe to drain prior to updating the configuration of the MAC layer.

21. The Ethernet apparatus of claim 20, wherein the Ethernet apparatus is configured to be installed a host device, further configured, when coupled to the link partner via the Ethernet link and installed in the host device, to:
prior to updating the configuration of the MAC layer,
reporting a link pause status to software running on the host device; and
after the configuration of the MAC layer has been updated,
reporting a link end of pause status to the software running on the host device.

22. The Ethernet apparatus of claim 12, wherein the Ethernet apparatus comprises an Ethernet Network Interface Controller (NIC).

* * * * *